United States Patent [19]

Yang

[11] Patent Number: 5,160,175

[45] Date of Patent: Nov. 3, 1992

[54] QUICK PIPE COUPLING WITH INFLATABLE SEAL AND PIN RETAINER

[76] Inventor: Ming-Tung Yang, No. 4-3 Lane 97, Lung Chuan Street, Panchiao, Taipei Hsien, Taiwan

[21] Appl. No.: 748,507

[22] Filed: Aug. 22, 1991

[51] Int. Cl.⁵ .............................................. F16L 17/00
[52] U.S. Cl. ................................... 285/104; 285/105; 285/108; 285/90; 285/404; 277/34.3
[58] Field of Search ................. 285/91, 96, 97, 104, 285/105, 108, 113, 404, 306, 83; 277/34, 34.3

[56] References Cited

U.S. PATENT DOCUMENTS

| | | | |
|---|---|---|---|
| 922,075 | 5/1909 | Bates | 285/97 |
| 3,843,167 | 10/1974 | Gronstedt | 285/105 |
| 4,059,295 | 11/1977 | Helm | 285/105 |
| 4,892,144 | 1/1990 | Coone | 277/34 X |

FOREIGN PATENT DOCUMENTS

| | | | |
|---|---|---|---|
| 868329 | 12/1941 | France | 285/97 |
| 556010 | 9/1943 | United Kingdom | 285/97 |

Primary Examiner—Randolph A. Reese
Assistant Examiner—Timothy Aberle
Attorney, Agent, or Firm—Bacon & Thomas

[57] ABSTRACT

A quick pipe coupling a circular receiving chamber adjacent to the orifice thereof for holding a movable taper ring and an inflatable tube, an U-shaped lock pin releasably inserted therein to retain the taper ring in place, a toothed lock ring fastened in the orifice, wherein the movable taper ring is squeezed by said inflatable tube against the teeth on the toothed lock ring when the U-shaped lock pin is removed from the pipe coupling, causing the teeth on the toothed lock ring to respectively engage into the outer surface of the pipe inserted through the lock ring, the movable taper ring and the inflatable tube into the pipe coupling so that the pipe inserted therein is firmly retained in place.

7 Claims, 7 Drawing Sheets

QUICK PIPE COUPLING WITH INFLATABLE SEAL AND PIN RETAINER

BACKGROUND OF THE INVENTION

The present invention relates to pipe couplings and relates more particularly to a pipe coupling which has an inflatable tube, a taper ring and a toothed lock ring fastened therein and controlled by an U-shaped lock pin to quickly retain the pipe inserted therein.

In constructions, pipes or conduits may be connected in series for delivering liquid from place to place. For connecting pipes together, pipe couplings are used. According to conventional methods, a pipe may be directly connected to a pipe coupling through plug-in joint and then sealed by adhesive glue or sealing compound, or connected to a threaded pipe coupling through screw joint and then sealed by sealing wax or suitable sealing compound. These pipe connecting methods are inconvenient to operate. Further, in connecting city water supply pipes, expansion pipe couplings may be used. When either section of the pipes is damaged causing leakage of water, the adjacent expansion pipe coupling can be conveniently sealed. However, this structure of expansion pipe coupling is expensive to manufacture.

SUMMARY OF THE INVENTION

The present invention has been developed to overcome the deficiencies of the prior art as discussed above. It is therefore an object of the present invention to provide a quick pipe coupling which is convenient in use to connect pipes together without the use of any sealing compound. According to the present invention, a quick pipe coupling has a circular receiving chamber adjacent to the orifice thereof for holding a movable taper ring and an inflatable tube, an U-shaped lock pin releasably inserted therein to retain said taper ring in place, a toothed lock ring fastened in said orifice to hook in the pipe inserted therein. The inflatable tube is inflated to squeeze the taper ring toward the lock ring when the lock pin is removed from the pipe coupling. The lock ring has teeth which are squeezed by the taper ring to engage into the outer surface of the pipe which is inserted therein when the lock pin is removed from the pipe coupling. By means of the effect of the inflatable tube, the gap between the pipe and the pipe coupling is sealed.

DETAILED DESCRIPTION OF THE PREFERRED EMBODIMENTS

Figure 1:
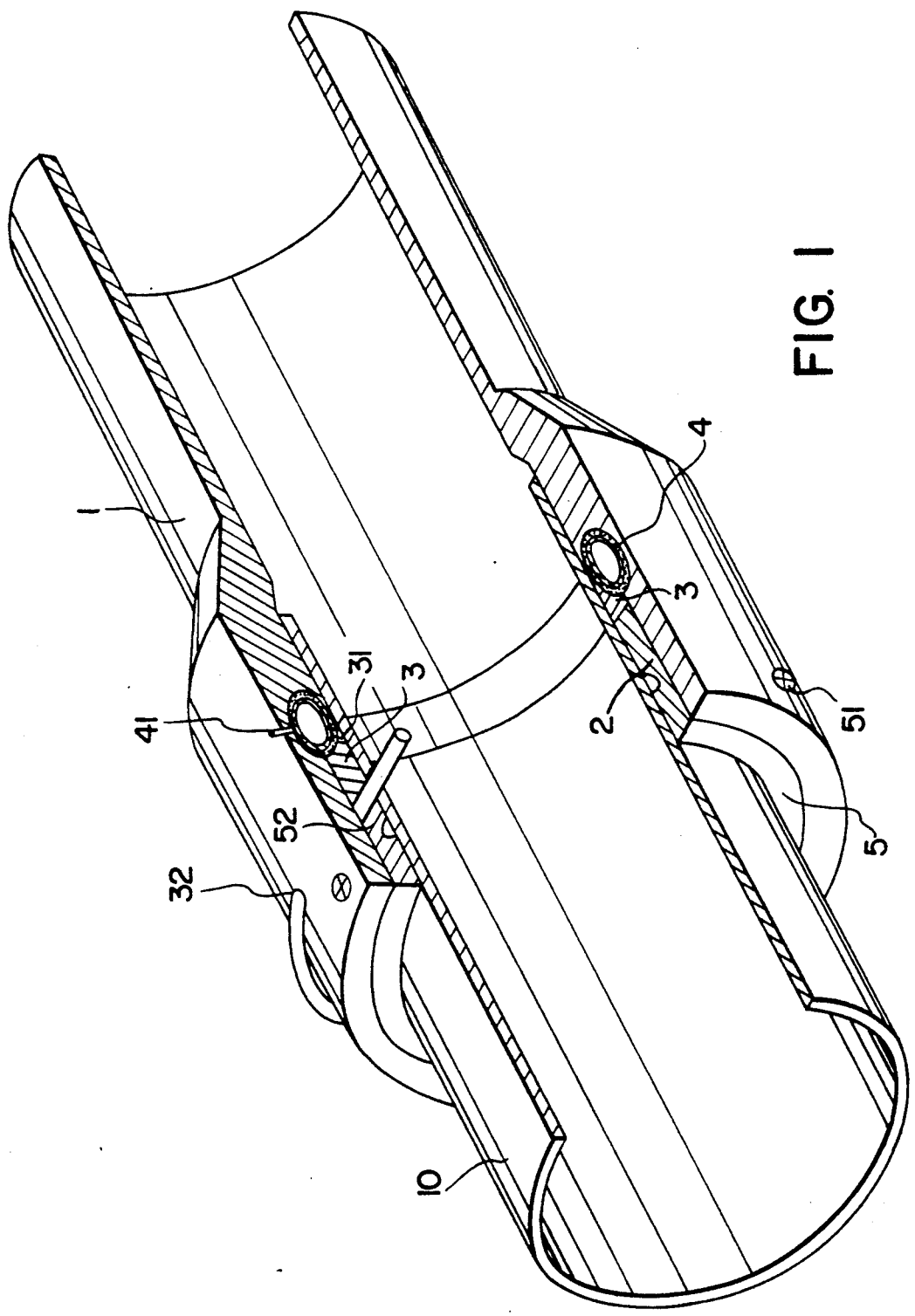
FIG. 1 is a perspective and partly sectional view of a quick pipe coupling embodying the present invention.
Figure 2:
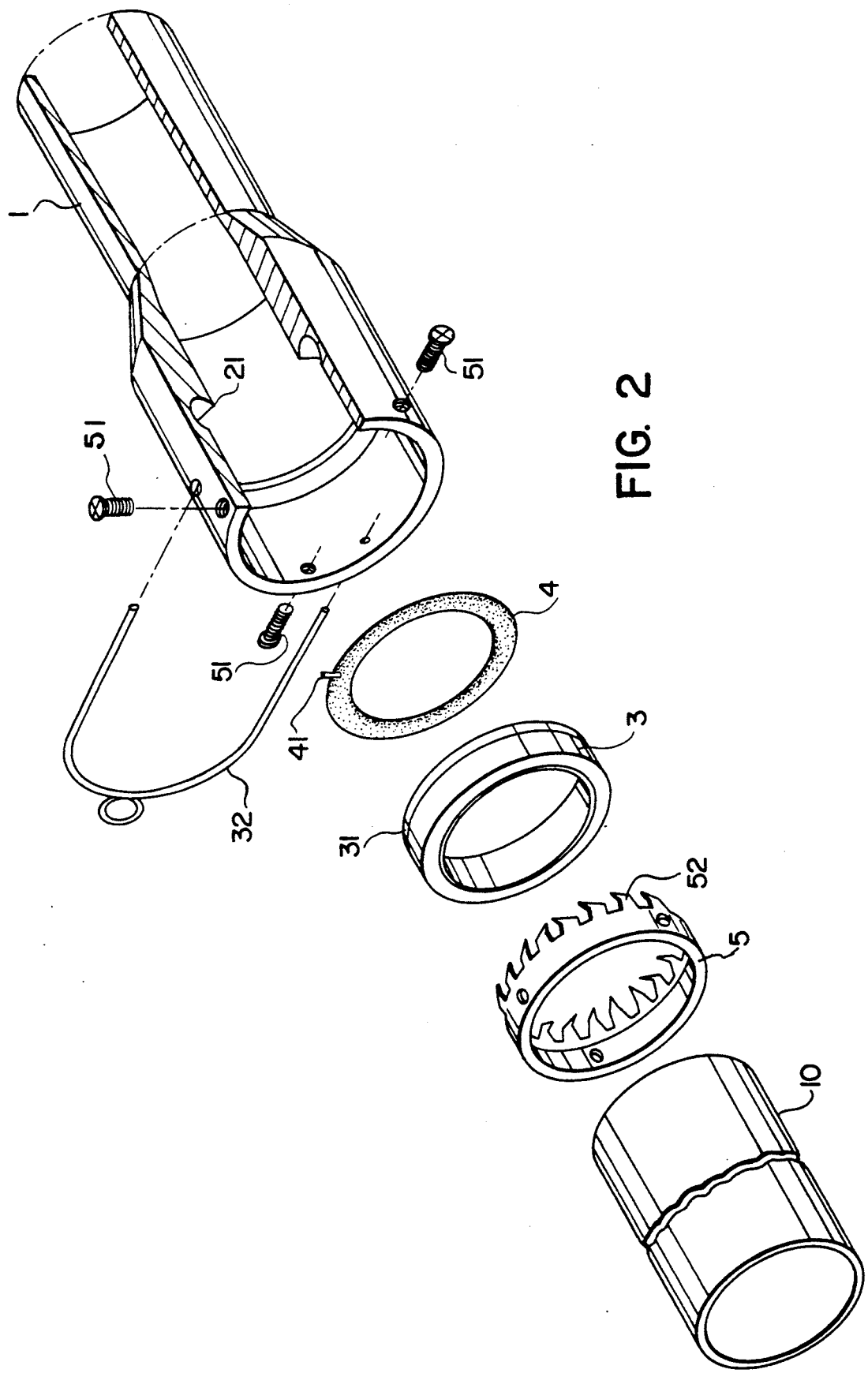
FIG. 2 is an exploded perspective view thereof.
Figure 3:
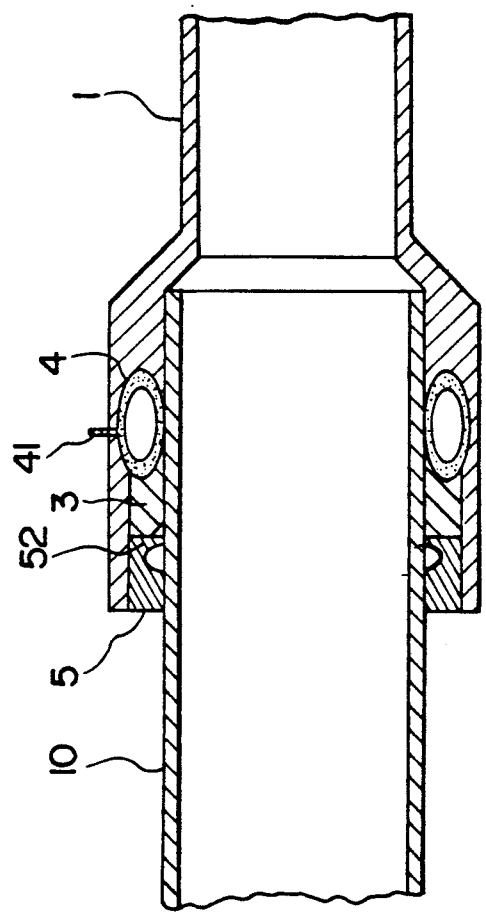
FIG. 3 is a sectional assembly view thereof taken in longitudinal direction.

Turning now to the annexed drawings in detail and referring first to FIGS. 1 and 2, a pipe coupling 1 in accordance with the present invention is generally comprised of a circular receiving chamber 2 for holding a taper ring 3 which is locked in place by an U-shaped lock pin 32 and has a tapered wall surface 31. The circular receiving chamber 2 has a hook-shaped cross section defining therein an annular groove 21 at one end for the setting therein of an inflatable tube 4 which has an air valve 41 which protrudes over the outer surface of the coupling 1 and through which said inflatable tube 4 can be inflated. A lock ring 5 which has a plurality of curved teeth 52 projecting inwards around the peripheral edge thereof at one end is inserted in the pipe coupling 1 at one end and secured in place by screws 51 or any of a variety of fastening means or methods. During assembly process, the inflatable tube 4 is set in the annular groove 21, which inflatable tube 4 after having been inflated is properly sealed, the taper ring 3 is set in the receiving chamber 2 and secured in place by the U-shaped lock pin 32, and the lock ring 5 is fastened in the coupling 1 at one end by screws. When in use, the U-shaped lock pin 32 is removed from the coupling 1 permitting the taper ring 3 to be squeezed by the inflatable tube 4 against the curved teeth 52 of the lock ring 5, and therefore, the curved teeth 52 of the lock ring 5 are squeezed inwards by the taper ring 3 to engage into the outer wall surface of the pipe 10 which is inserted through the lock ring 5, the taper ring 3 and the inflatable tube 4 into the coupling 1. Therefore, the pipe 10 becomes firmly retained in the coupling 1 by the curved teeth 52 of the lock ring 5 and the inflatable tube 4.

As indicated, a pipe can be conveniently attached to the pipe coupling of the present invention simply by removing the U-shaped lock pin from the pipe coupling before the insertion therein of the pipe to be connected.

Figure 4:
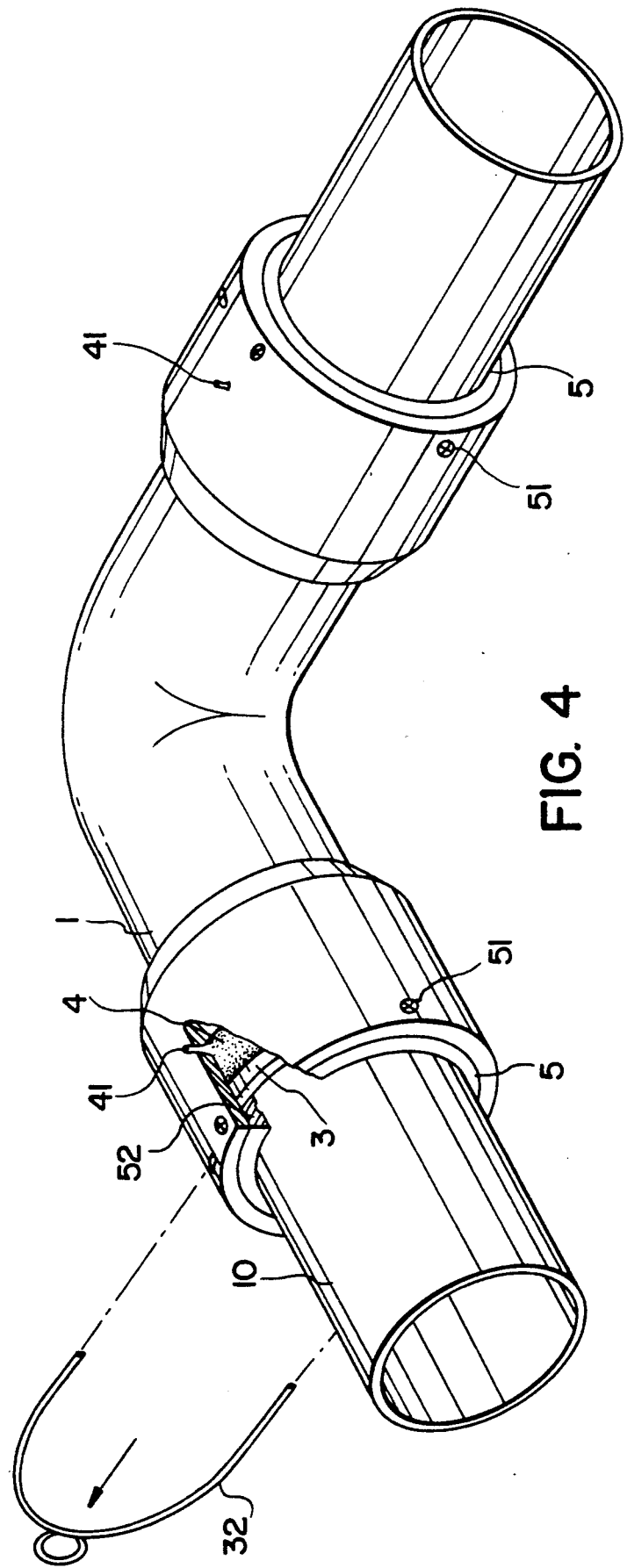
FIG. 4 illustrates an alternate form of the present invention which is to be used for connecting two pipes at right angle.
Figure 5:
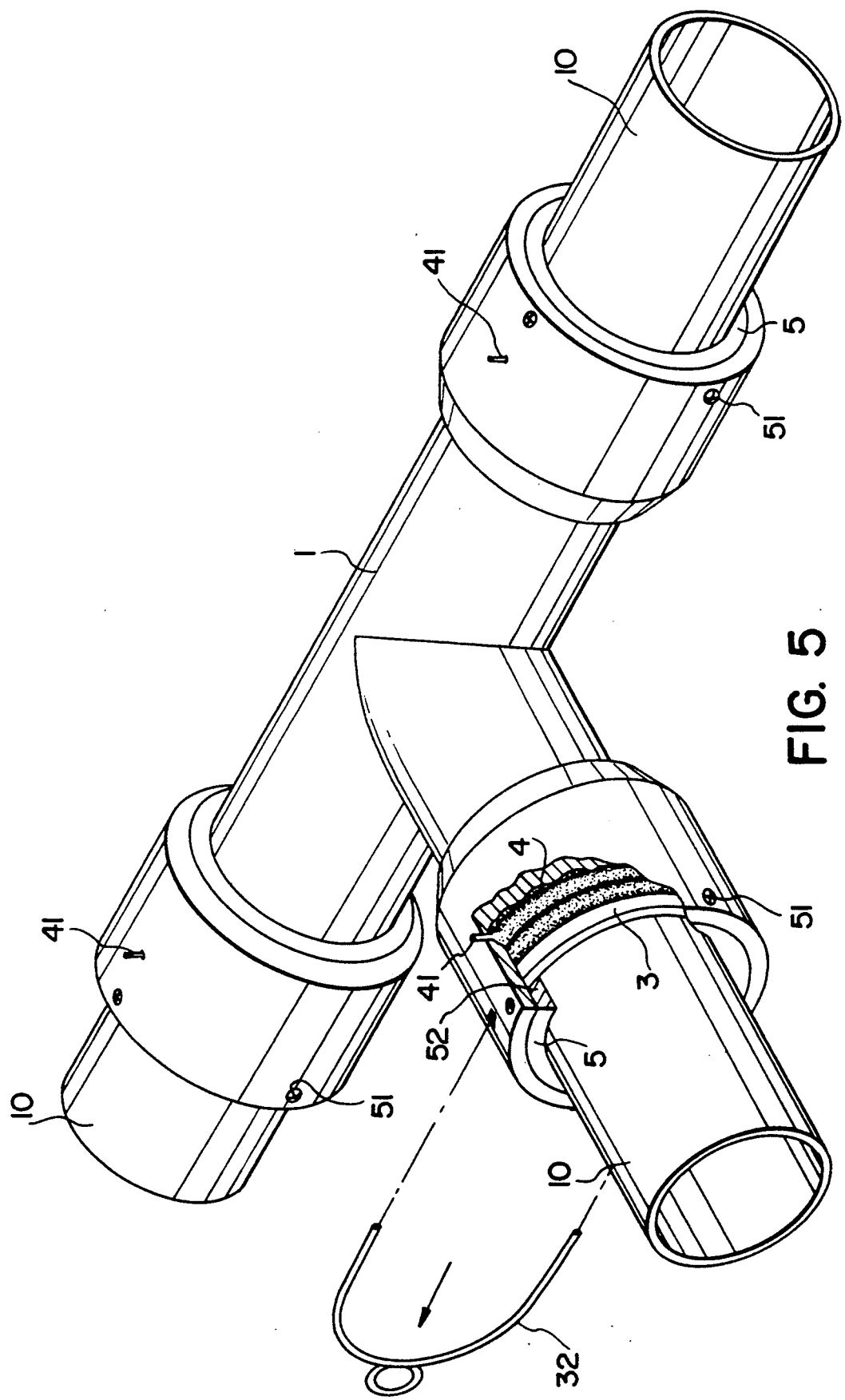
FIG. 5 illustrates another alternate form of the present invention which is to be used as a three-way pipe connector.
Figure 6:
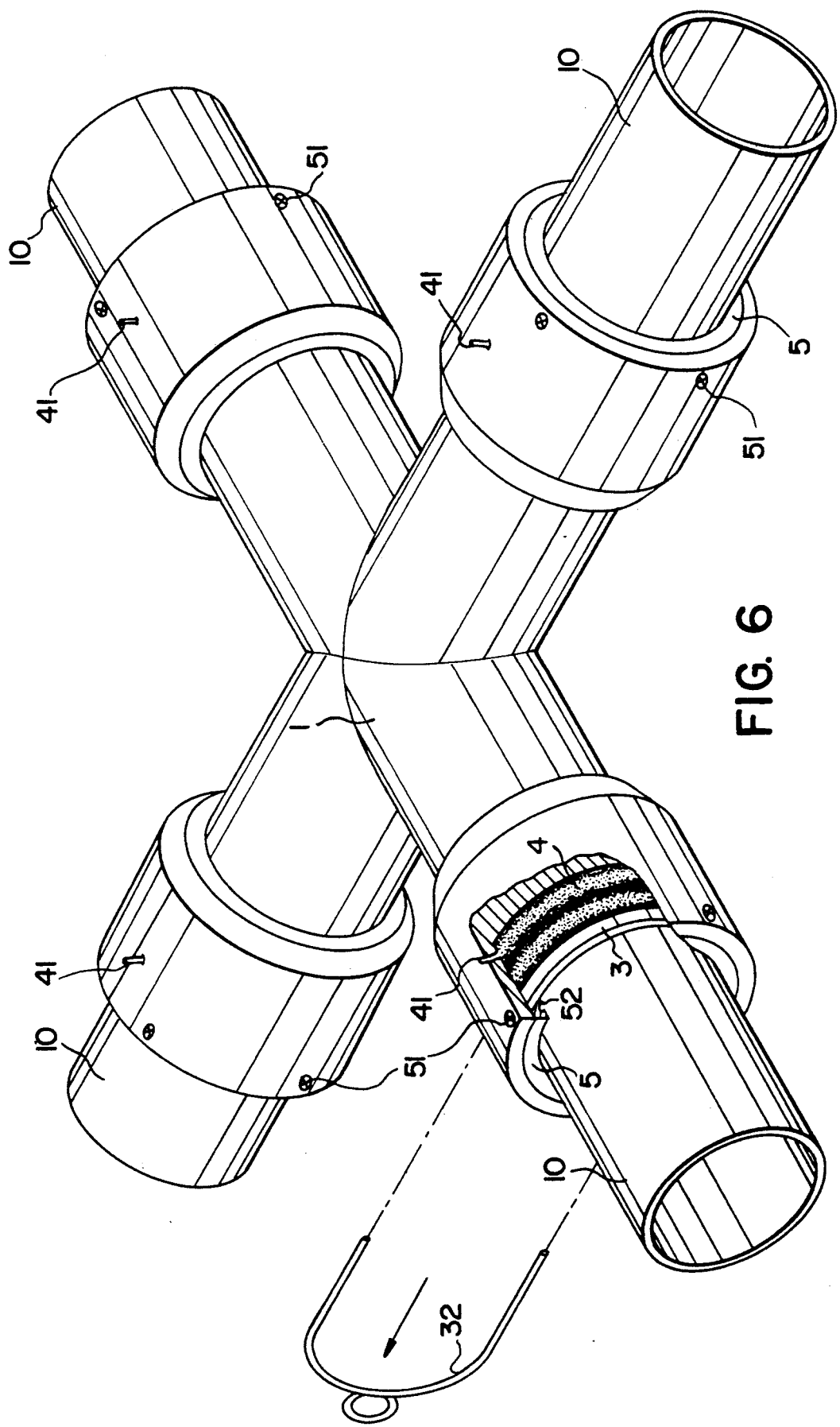
FIG. 6 illustrates still another alternate form of the present invention which is to be used as a four-way pipe connector.
Figure 7:
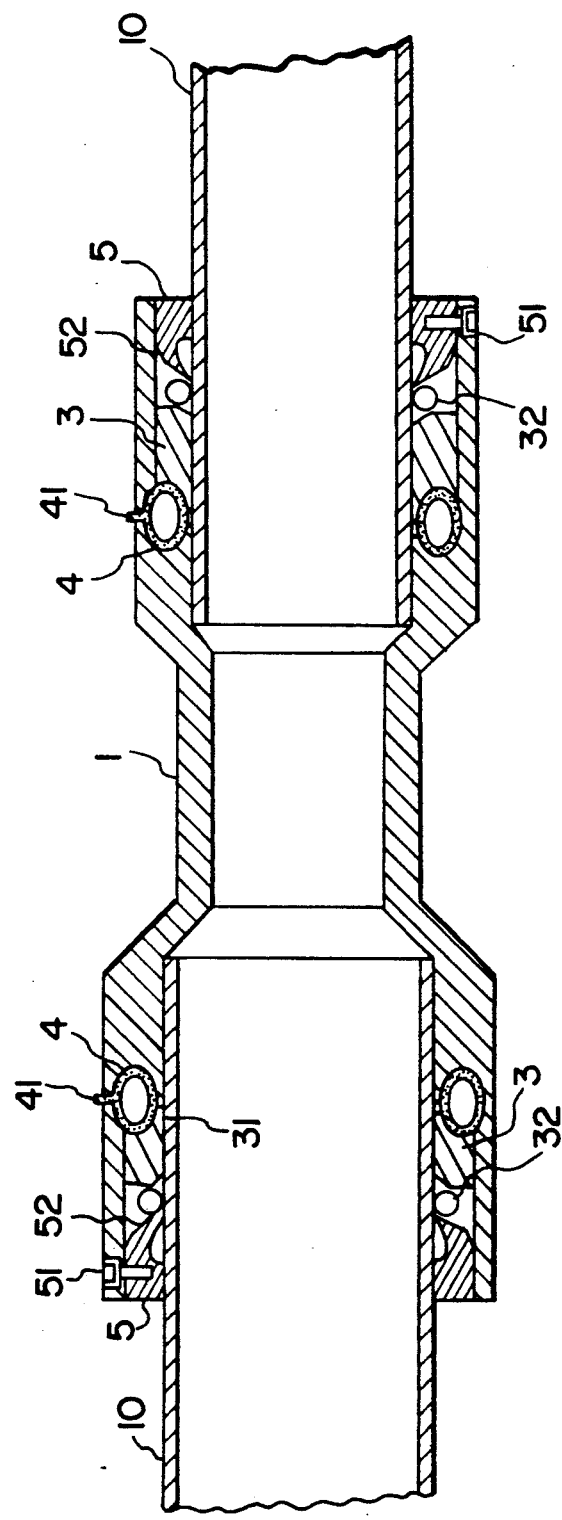
FIG. 7 illustrates a yet further alternate form of the present invention which is to connect a small pipe to a bigger pipe.

While the invention has been described in conjunction with the specific embodiment thereof, it is evident that may alternatives, modifications and variations will become apparent to those skilled in the art in light of the foregoing description. For examples: the pipe coupling can be made in an arrangement as shown in FIG. 4 for connecting two pipes at right angle; in the form of a three-way pipe connector as shown in FIG. 5; in the form of a four-way pipe connector as shown in FIG. 6; or in the form shown in FIG. 7 for connecting a small pipe to a bigger pipe. Accordingly, it is intended to embrace all such alternatives, modifications, and variations as fall within the scope of the present invention.

What is claimed is:

1. A pipe coupling comprising:

a chamber, defining a longitudinal axis for receiving a pipe to which the pipe coupling is to be secured;

an annular inflatable sealing tube seated in said chamber and adapted to extend about the pipe;

a first ring received within said chamber and adapted to receive said pipe and abut said sealing tube;

a second ring received within said chamber and adapted to receive said pipe, said second ring including a plurality of locking teeth arranged to be biased by said first ring into locking engagement with said pipe;

means for fixedly securing said second ring to said pipe coupling with said sealing tube, said first ring, and said second ring longitudinally spaced within said chamber; and means for inflating said sealing tube in order to bias said first ring into engagement with said second ring thereby causing said plurality of locking teeth to securely engage said pipe.

2. The pipe coupling of claim 1, wherein said first ring has an inner diameter tightly fitting the outer diameter of said pipe.

3. The pipe coupling of claim 1, wherein said first ring tapers over a predetermined portion thereof.

4. The pipe coupling of claim 1, wherein said chamber includes an annular groove into which said sealing tube is seated.

5. The pipe coupling of claim 4, wherein said annular groove is hook-shaped in cross section.

6. The pipe coupling of claim 1, further comprising:

aperture means extending through said pipe coupling between said first and second rings; and a lock pin adapted to extend through said aperture means to retain said sealing tube and said first ring within said chamber prior to inflating said sealing tube and causing said plurality of teeth to securely engage said pipe.

7. A method of securing a pipe to a pipe coupling having a pipe receiving chamber defining a longitudinal axis, said chamber including an annular groove formed therein and at least one aperture extending therethrough perpendicular to said longitudinal axis, said method comprising:

seating an annular, inflatable sealing tube within said chamber;

placing a first ring into said chamber in engagement with said sealing tube;

securing said first ring in its longitudinal position by extending a locking pin through said at least one aperture;

fixedly securing a second ring having a plurality of locking teeth within said chamber with said teeth facing said first ring;

placing a pipe into said chamber, through said first ring, said second ring and said sealing tube;

removing said locking pin from said at least one aperture; and inflating said sealing tube to force said first ring to bias said locking teeth of said second ring into engagement with said pipe.

* * * * *